United States Patent
Kittrell et al.

(10) Patent No.: US 6,464,951 B1
(45) Date of Patent: Oct. 15, 2002

(54) METHOD, CATALYST, AND PHOTOCATALYST FOR THE DESTRUCTION OF PHOSGENE

(75) Inventors: James R. Kittrell, Amherst; David A. Gerrish, South Deerfield; Michael C. Milazzo, Montague, all of MA (US)

(73) Assignee: KSE, Inc., MA (US)

( * ) Notice: Subject to any disclaimer, the term of this patent is extended or adjusted under 35 U.S.C. 154(b) by 0 days.

(21) Appl. No.: 09/553,627

(22) Filed: Apr. 20, 2002

(51) Int. Cl.[7] .............................. C01B 7/00; B01J 23/00; B01J 23/72; B01D 17/06; C07C 5/00

(52) U.S. Cl. ........................... 423/240 R; 423/240 S; 502/305; 502/306; 502/307; 502/308; 502/309; 502/313; 502/319; 502/321; 502/344; 502/345; 502/349; 204/158.2; 204/157.3; 204/157.48; 204/157.15; 204/158.21; 210/748

(58) Field of Search ................... 423/240 R, 240 S; 204/158.2, 157.3, 157.48, 157.15, 158.21; 210/748; 502/305, 306, 307, 308, 309, 313, 319, 321, 344, 345, 349

(56) References Cited

U.S. PATENT DOCUMENTS

| 4,064,218 | A | | 12/1977 | Scholz et al. ............... 423/240 |
|---|---|---|---|---|
| 4,301,126 | A | | 11/1981 | Duembgen et al. ......... 423/240 |
| 4,493,818 | A | | 1/1985 | Gross ......................... 423/240 |
| 4,764,308 | A | | 8/1988 | Sauer et al. ................. 260/544 |
| 4,900,523 | A | | 2/1990 | Bicker et al. ............... 423/236 |
| 4,966,665 | A | | 10/1990 | Ibusuki et al. .............. 204/157.3 |
| 5,254,797 | A | * | 10/1993 | Imoto et al. ................ 588/207 |
| 5,283,041 | A | * | 2/1994 | Nguyen et al. ............ 423/240 S |
| 5,362,399 | A | | 11/1994 | Schwarz et al. ............. 210/689 |
| 5,451,388 | A | * | 9/1995 | Chen et al. ............... 423/240 R |
| 5,492,882 | A | | 2/1996 | Doughty et al. ............. 502/417 |
| 5,779,912 | A | * | 7/1998 | Gonzalez-Martin et al. 210/748 |
| 6,051,198 | A | * | 4/2000 | Sano et al. ............... 423/240 S |
| 6,179,971 | B1 | * | 1/2001 | Kittrell ..................... 204/158.2 |
| 6,179,972 | B1 | * | 1/2001 | Kittrell ..................... 204/158.2 |
| 6,221,259 | B1 | * | 4/2001 | Kittrell ........................ 210/748 |

FOREIGN PATENT DOCUMENTS

| DE | 961681 | | 4/1958 | |
|---|---|---|---|---|
| DE | 1667438 | | 4/1969 | |
| DE | 141265 | * | 4/1980 | ............ A62D/3/00 |
| GB | 1217615 | * | 12/1970 | ............ B01D/53/00 |
| GB | 1479507 | * | 7/1977 | ............ G01N/31/10 |

* cited by examiner

Primary Examiner—Steven P. Griffin
Assistant Examiner—Jonas N. Strickland

(57) ABSTRACT

In accordance with the present invention, a catalyst is described which comprises at least one metal selected from the group consisting of copper, zinc, iron, tungsten, molybdenum, and chromium distributed over a catalyst support comprising a material containing at least one of silicon, titanium, zirconium, magnesium, aluminum, and activated carbon. The catalyst is used to remove phosgene from a contaminated gas stream and/or reduce or eliminate phosgene from an effluent of a previously treated gas stream. At least one metal in the catalyst of the present invention is preferably present in an amount from about 0.001 wt % to about 15 wt %. When more than one metal is present, the combined metals preferably do not exceed 20 wt %. Catalysts in accordance with the present invention may be used as Photocatalysts. Processes for using the catalysts and Photocatalysts of the present invention are also described.

37 Claims, No Drawings

METHOD, CATALYST, AND PHOTOCATALYST FOR THE DESTRUCTION OF PHOSGENE

BACKGROUND OF THE INVENTION

The present invention relates to a process for treating a contaminated gas stream and to a catalyst for reducing the phosgene content in the gas stream by conversion of the contaminant into less harmful products.

In spite of decades of effort, a significant need remains for an advanced technology to control stationary source emissions of volatile organic compounds (VOCs) as for example benzene, chlorinated volatile organic compounds (CVOCs) as for example trichloroethylene, and toxic air pollutants (TAPs) as for example acrylonitrile. A particular need exists for technology which controls emissions from industrial processes and other applications where low concentrations of VOCs and TAPs are present in high flow rate air streams.

Dilute air stream pollution control is becoming recognized as a major environmental control issue for the United States industrial community at large. For example, the control of indoor air pollution associated with solvent degreasing operations is necessary, including the dilute emissions associated with exhaust ventilation fans. Also, air stripping of contaminated groundwater produces dilute air emissions for which current technology provides no satisfactory solution. Catalytic combustors are available, but require processing tremendous volumes of air and result in uneconomic performance. Thermal incinerators require excessive supplemental fuel for dilute mixtures, and exhibit uncertain selectivity when CVOCs are involved. Gas membrane processes are only now emerging for gas separation, and are ill-suited for dilute mixtures. Pressure swing adsorption using zeolites or resins is not applicable to dilute mixtures, and rotating wheel adsorbers are uneconomic for such dilute concentrations of organics. Packed bed activated carbon adsorption is widely practiced, but creates a hazardous solid waste which is increasingly difficult to manage. Carbon regeneration by steam is costly, and is generally economic only for very large scale operations. Landfill options for spent carbon will become more limited, as it involves transportation and disposal of hazardous wastes, particularly for CVOC applications.

Control of indoor air pollution is also of growing importance, with the objective of enhancing workplace environmental health and safety protection. The Occupational Safety and Health Administration (OSHA) is promulgating new regulations to reduce workplace exposure to indoor air contaminants such as CVOCs. Many CVOCs are particularly toxic. Certain CVOCs are suspected carcinogens, others are linked to possible birth defects, and still others are suspected active precursors in the destruction of the stratospheric ozone layer. Of the 189 targeted air toxics in the Clean Air Act Amendments of 1990, about one-third of the compounds are chlorinated. By the standards of conventional air pollution control technology, indoor air pollution is at exceedingly dilute concentrations. An effective and economic pollution control technology in dilute air systems is the objective of this invention.

In spite of considerable efforts of researchers in the field, most UV photolytic and photocatalytic systems exhibit shortcomings in performance which limit their commercial utility for air pollution control. When treating air to remove CVOC contaminants, one shortcoming of note is the propensity of such processes to produce undesirable byproducts of incomplete oxidation, both by the photolytic treatment of CVOC contaminated air and by the photocatalytic treatment of CVOC contaminated air. Indeed, some such byproducts can be more harmful than the original contaminant being removed, such as the formation of phosgene byproduct through both photolytic and photocatalytic oxidation of trichloroethylene. As used herein, photolytic oxidative destruction is defined as the reaction of contaminants in an oxygen-containing gas stream as a result of the action of the ultraviolet radiation, by oxidation reactions, decomposition reactions, bond-scission reactions, and the like. Photocatalytic oxidative destruction is defined as the reaction of contaminants from an oxygen-containing gas stream as a result of the action of the ultraviolet radiation on the surface of a photocatalyst, by oxidation reactions, decomposition reactions, bond-scission reactions, and the like.

The photocatalytic oxidation of chlorinated hydrocarbon emissions often produces phosgene as a byproduct. U.S. Pat. No. 4,966,665 discloses the use of titanium dioxide as a photocatalyst for destruction of chlorine-containing organic compounds in an oxygen bearing vent gas. When a vent gas containing 30 ppm TCE was contacted with titanium dioxide for 26 seconds, a 90% destruction of TCE was obtained. However, the analysis of the reactor products revealed the formation of 4 ppm phosgene as a byproduct of the reaction. This phosgene production must be controlled, so as not to be emitted into the atmosphere.

Phosgene also is a contaminant in a number of industrial process emissions, and economic and simple means to control these emissions is required. Duembgen, et al., in U.S. Pat. No. 4,301,126, teach that phosgene can be decomposed catalytically in the presence of active carbon by hydrolysis with water vapor, at temperatures of 10° C. to 80° C. However, tests in the examples that follow show that the effectiveness of this system declines with time of usage, probably because of the difficulty of replacing the OH⁻ groups on the carbon which have been consumed through hydrolysis of the phosgene.

German Patent No. 961,681 teaches that phosgene can be catalytically decomposed by contact with activated carbon and liquid water. However, with this technique, it is difficult to control the correct flow and proper dispersion and contacting of water with the carbon. Further, it requires a long residence time of operation.

Sauer et al., in U.S. Pat. No. 4,764,308, teach that phosgene can also be formed from a mixture of chlorine and carbon monoxide over activated carbon, at temperatures from 50° C. to over 250° C.

German Application DASA 1,667,438 discloses a process where phosgene is destroyed by contacting phosgene and water vapor with an alkali-activated alumina at temperatures from 95° C. to 190° C. However, substantial energy is consumed to raise the gas stream to these high temperatures, and the alkali would be consumed by the phosgene and must be replaced at considerable cost.

Schwarz, et al., in U.S. Pat. No. 5,362,399, teach removal of trace amounts of water from a phosgene stream containing at least 60% phosgene by contacting the stream with a strongly basic macroreticular anion exchange resin which catalyzes the hydrolysis of phosgene and the trace of water. The residence time required for this operation is measured in minutes, which may be economic for the liquid streams mentioned in the '399 patent, but not for the gaseous streams which the present invention is directed to.

Scholz, et al., in U.S. Pat. No. 4,064,218, disclose that phosgene can be removed from an off-gas stream, by washing with an aqueous solution of alkali and ammonia, at a temperature of 10° C. to 100° C. Bicker, et al., in U.S. Pat. No. 4,900,523, disclose that phosgene can be removed from waste gases by contact with an aqueous solution of at least one amine. Gross, in U.S. Pat. No. 4,493,818, discloses that phosgene can be removed from an off-gas by contacting with an aqueous solution containing alkali metal hydroxide and a tertiary amine compound. The use of such aqueous scrubbers is more complex to operate and more costly than the technology of the present invention.

Doughty, et al., in U.S. Pat. No. 5,492,882, disclose a metal-promoted activated carbon adsorbent for removing noxious gases from a contaminated air stream. The activated carbon is impregnated with at least one compound selected from each of the groups of sulfuric acid and sulfuric acid salts, molybdenum compounds, and copper and zinc compounds. Adsorption processes are uneconomic because they require a means to regenerate the adsorbent or replacement of the adsorbent after it is spent.

SUMMARY OF THE INVENTION

It is an object of the present invention to provide an improved catalyst for efficient removal of phosgene from or reduction of the phosgene content in contaminated gases.

It is another object of the present invention to provide an improved process for removing phosgene from or reducing the phosgene content of contaminated gases.

It is a further object of the present invention to provide an improved photocatalyst for purifying a contaminated gas stream by conversion of contaminants into a less harmful product.

It is still another object of the present invention to provide an improved photocatalytic process for oxidative destruction of chlorinated hydrocarbons in air by reducing or eliminating co-product phosgene production for the process.

It is yet another object of the present invention to provide a process as above which is easy to employ commercially at large scale and is inexpensive.

The foregoing objects are attained by the process and the catalyst of the present invention.

In accordance with the present invention, a process for treating a contaminated gas stream so as to reduce or eliminate any phosgene content in the gas stream is described. The process comprises the steps of providing a catalyst comprising at least one metal selected from the group consisting of copper, zinc, iron, tungsten, molybdenum, chromium, and mixtures thereof distributed over a catalyst support comprising a material containing at least one of silicon, titanium, zirconium, magnesium, aluminum, and activated carbon; operating the catalyst at a temperature from about 0° C. to about 250° C. at a pressure from about 0.1 atm. to about 10 atm. and at a contact time of about 0.01 seconds to about 5 minutes; and reducing the phosgene content in the gas stream by reacting the phosgene in the gas stream by placing the contaminated gas stream in contact with the catalyst.

Further in accordance with the present invention, a catalyst is described which comprises at least one metal selected from the group consisting of copper, zinc, iron, tungsten, molybdenum, chromium, and mixtures thereof distributed on a catalyst support comprising at least one of a titanium containing material and a zirconium containing material. The catalyst may be used to remove phosgene from a contaminated gas stream and/or reduce or eliminate phosgene from the effluent of a previously treated gas stream. At least one metal in the catalyst of the present invention is preferably present in an amount from about 0.001 wt % to about 15 wt %. When more than one metal is present, the combined metals preferably do not exceed 20 wt %. Catalysts in accordance with the present invention may be used as photocatalysts.

In yet another aspect of the present invention, a process of purifying a contaminated gas stream by conversion of the contaminants into a less harmful product is described. This process comprises passing a contaminated gas stream through a photolytic and/or photocatalytic stage; and reducing any phosgene co-product found in the effluent of the photolytic/photocatalytic stage by passing said effluent over a catalyst comprising at least one metal selected from the group of copper, zinc, iron, tungsten, molybdenum, chromium, and mixtures thereof distributed over a catalyst support comprising a material containing at least one of silicon, titanium, zirconium, magnesium, aluminum, and activated carbon.

Other details of the catalyst, photocatalyst, and processes of the present invention are set forth in the following detailed description.

DETAILED DESCRIPTION OF THE PREFERRED EMBODIMENT(S)

Catalysts, also having use as photocatalysts, in accordance with one aspect of the present invention are formed by one or more of the metals from the group consisting of copper, zinc, iron, tungsten, molybdenum, and chromium distributed over a catalyst support, preferably a photocatalytically active support when used as a photocatalyst. In these catalysts, at least one of the foregoing metals is present in an amount from about 0.001 wt % to about 15 wt %. If more than one of the foregoing metals is present, the total of the metals preferably does not exceed 20 wt %. In one advantageous embodiment, the at least one metal comprises tungsten or molybdenum in an amount from 0.015 wt % to about 5.0 wt %. In yet another advantageous embodiment, copper and molybdenum are distributed over the catalyst support. In this embodiment, a preferred catalyst support is one formed from a titanium containing material.

The catalyst support preferably comprises a material containing at least one of silicon, titanium, zirconium, magnesium, aluminum, and activated carbon. A preferred support is one formed from titanium containing material, such as titania, and/or a zirconium containing material. Alternatively, the catalyst support may comprise titania or a mixture of titania and silica.

It has been found that a particularly useful catalyst for removing contaminants from a gas stream comprises a catalyst support formed from a material containing at least one of silicon, titanium, zirconium, magnesium, aluminum, and activated carbon and further comprises a material which forms a silicon-tungsten bond deposited on the catalyst support. The silicon-tungsten bond forming material may comprise a silicon-tungsten compound. Alternatively, a silicon containing material and a tungsten containing material may be deposited on the catalyst support.

Catalysts in accordance with the present invention may be prepared by impregnation by the incipient wetness method. In this method, a solution of the salt of the claimed catalytic metal(s) is prepared, either in water or an organic solvent, depending on the solubility of the salt. The metals are distributed over a support selected from the materials listed above. To accomplish this, the catalyst support is contacted with just enough of this salt solution to absorb the solution into the pores, fully saturating the pores. In this case, the addition of another drop of solution would not absorb in the pores, but rather would drop to the bottom of the beaker. Then, the catalyst may be dried slowly at 70° C. to remove moisture without metal migration to the exterior of the catalyst particle, then fully dried at 115° C., and then calcined at temperatures of about 150° C. to 500° C. for several hours.

Catalysts may also be prepared by gelation procedures, based on the known art of catalyst synthesis. For example, suitable preparation procedures are described in U.S. Pat. Nos. 3,639,271 and 3,699,873, which are incorporated by reference herein. To prepare a catalyst, two solutions may be first prepared. One solution is comprised of 1000 ml. of distilled, deionized water to which 500 ml. of the PQ Corporation "N" brand water glass is added. The "N" brand water glass has a $SiO_2/Na_2O$ ratio of 3.22. The second solution contains 245 ml. of 4.0 N hydrochloric acid diluted with 300 ml. of distilled, deionized water. After both solutions are cooled to 5° C., the water glass solution is added to the acid solution with vigorous agitation. Any of the aforementioned metals in salt form may be added at this point, as aqueous or nonaqueous solutions or as finely divided solids. The resulting solution or suspension is then poured into a shallow flat tray. The mixture resulting from combining the two solutions has a pH of approximately 6.2 and an initial gel time of about 2 minutes. The gel time can be increased or decreased as desired, by adjustment of the solution concentrations and final pH. Within minutes, the gel is stiff enough to cut into cubes. Cubes of gel are cut about one inch on a side and immediately transferred to a 3 liter Buchner funnel. The cubes are soaked in 1 N HCl for about two hours with enough acid to cover the gel. The acid soaking is repeated three times. The gel cubes are then washed free of sodium ions with distilled, deionized water, and dried in air for about four hours at 150° C. At this stage of preparation, the gel is typically transparent. If opacity is observed, the drying period can be prolonged. The gel preparation is completed by calcining in air at about 200° C. to 550° C.

In one aspect of the present invention, a catalyst in accordance with the present invention may be used to destroy phosgene in a contaminated gas stream, thereby reducing or eliminating the phosgene content of the gas. When used in this manner, the catalyst of the present invention is operated at a temperature of from about 0° C. to about 250° C., preferably about 25° C. to about 100° C., at a pressure from about 0.1 atm. to about 10 atm., preferably from about 0.8 atm. to about 2 atm., and at a contact time of about 0.01 seconds to about 5 minutes, preferably about 0.1 seconds to about 10 seconds. The term "contact time", as used herein, is defined as the ratio of the volume of the catalyst to the total volumetric flow rate of air passing through the reactor at the temperature and pressure of the air entering the reactor.

In another aspect of the present invention, the catalysts in accordance with the present invention may be used as a post-treatment step in a photocatalytic or a photolytic process for the destruction of chlorinated hydrocarbons in air, thereby reducing or eliminating the phosgene co-product found in the effluent of the photocatalytic or photolytic process. In this case, a photocatalytic and/or photolytic stage is initially used to treat the contaminated gas.

If a photolytic stage is used, a reactor vessel containing ultraviolet lamps through which the contaminated gas passes while being exposed to the action of UV radiation. No solid catalyst is used in the photolytic stage. The action of the UV radiation causes reactions of the contaminants, at least partially forming carbon dioxide. The photolytic stage may be operated such that it converts at least 10% (molar) of the entering contaminant of the contaminated gas to partially oxidized products. Excluded from this 10% yield of partially oxygenated byproducts are such fully oxidized products as carbon dioxide, water, hydrogen chloride and halogens such as chlorine or fluorine. Methods for control of photolytic stage operating conditions to accomplish these objectives include adjustment of temperature, residence time, and amount and intensity of ultraviolet radiation. If desired, alternating photolytic and photocatalytic stages can be employed in a repeating sequence to accomplish these objectives.

In the photolytic stage, the contaminated gas is exposed to UV radiation of a wavelength shorter than or equal to about 400 nanometers, preferably about 185 to about 254 nanometers.

In a photocatalytic stage, a reactor vessel is provided and the contaminated gas and the photocatalyst are exposed to ultraviolet light from a source of UV radiation which light has a wavelength shorter than about 400 nanometers. In the photocatalytic stage, the photocatalyst is exposed to this UV radiation, for example by using a reactor vessel which may contain a packed photocatalyst bed. The contaminated gas to be treated is passed over the photocatalyst bed while it is being illuminated with UV radiation. The photocatalyst using during the photocatalytic stage may be comprised of titania, silica, zirconia, or mixtures thereof. In one preferred embodiment, the photocatalyst is comprised primarily of silica, titanium in an amount from about 0.015 wt % to about 5.0 wt %, zirconium in an amount from about 0.015 wt % to about 5.0 wt %, and oxygen in an amount consistent with the chemical composition of the oxides of silicon, titanium, and zirconium. In yet another embodiment, the photocatalyst used in the bed comprises an effective amount of silicon, titanium in an amount from about 0.015 wt % to about 5.0 wt %, zirconium in an amount from about 0.015 wt % to about 5.0 wt %, oxygen in an amount consistent with the chemical composition of the oxides of silicon, titanium, and zirconium, and the balance primarily silica.

In a further alternative embodiment, a photocatalyst may be employed in the photocatalytic stage which is comprised of silicon in an amount from about 0.1 wt % to about 70 wt %, titanium dioxide in an amount from about 30 wt % to about 90 wt %, tungsten in an amount from about 0.1 wt % to about 50 wt %, preferably from about 1.0 wt % to about 30 wt %, and platinum or palladium, singly or in combination, in an amount up to about 10 wt %, preferably from about 0.1 wt % to about 5.0 wt %.

In yet another alternative embodiment, the photocatalyst to be used during the photocatalytic stage is comprised principally of titania, or principally titania containing up to 5% of at least one of platinum and palladium. In yet another alternative, the photocatalyst may be comprised principally of silica, or principally silica containing up to 5% platinum or palladium, singly or in combination. In still another equivalent reaction severity. The results are as follows:

alternative, the photocatalyst may be comprised principally of silica and titania or may be comprised principally of titantia and zirconia.

When using either a photocatalytic or a photolytic process, the photocatalytic or photolytic step is operated at temperatures from 0° C. to about 250° C., preferably from about 25° C. to about 100° C., and at a pressure from about 0.1 atm to about 10 atm., preferably from about 0.8 atm to about 2.0 atm. A contact time from about 0.01 seconds to about 5 minutes, preferably from about 0.1 seconds to about 30 seconds, is utilized.

Following the photocatalytic and/or photolytic step, a catalyst in accordance with the present invention is used to reduce or eliminate the phosgene content of the effluent gas. The conditions under which the phosgene destruction catalyst are used are those disclosed hereinabove.

In still another embodiment of the present invention, the photocatalyst used either during the photocatalytic stage or the post-photocatalytic stage and/or post-photolytic stage is comprised of one or more of the metals selected from the group consisting of copper, zinc, iron, tungsten, molybdenum, and chromium distributed over a photocatalytically active support. In said photocatalyst, at least one of the foregoing metals is present in an amount from about 0.001 wt % to about 15 wt %. If more than one of the foregoing elements is present, the total of said elements preferably does not exceed 20 wt %. The photocatalytically active support comprises a material containing at least one of silicon, titanium, zirconium, magnesium, aluminum, and activated carbon. Preferably, the copper, zinc, iron, tungsten, molybdenum and/or chromium is distributed on a support comprised primarily of silica, titanium in an amount up to about 5.0 wt %, zirconium in an amount up to about 5.0 wt %, and oxygen in an amount consistent with the chemical composition of the oxides of silicon, titanium and zirconium. Alternatively, the photocatalytically active support may be comprised principally of titania. A further alternative is to employ a photocatalytically active support comprised of silicon in an amount from about 0.1% by weight to about 70% by weight; titanium dioxide in an amount from about 30% by weight to about 90% by weight; tungsten in an amount from about 0.1% by weight to about 50% by weight, preferably 1.0 to 30% by weight; and platinum or palladium, singly or in combination, up to about 10% by weight, preferably about 0.1 to 5.0% by weight. Alternatively, the photocatalytically active support may be comprised principally of titania, containing up to 5% platinum or palladium, singly or in combination. Alternatively, the photocatalytically active support may be comprised principally of silica, containing up to 5% platinum or palladium, singly or in combination. For this photocatalytic embodiment(s), the gaseous mixture of contaminated air may be contacted with the catalyst in any fashion known in the art, preferably by passing the mixture over a packed bed of the photocatalyst which is illuminated with an ultraviolet light. The ultraviolet light can be caused to illuminate the photocatalyst in any fashion known in the art by surrounding the light bulbs by the photocatalyst, by illuminating alternate beds of the catalyst from top and bottom, or by other methods familiar to those skilled in the art. The wavelength of the ultraviolet light illuminating the photocatalyst is any wavelength customarily defined in the ultraviolet range, preferably of a wavelength of about 100 to 400 nanometers, and most preferably in the range of from about 184 to 375 nanometers.

The photocatalytic process would be operated at a temperature of from about 0° C. to about 250° C., preferably about 25° C. to about 100° C., at a pressure from about 0.1 atm. to about 10 atm., preferably from about 0.8 atm. to about 2 atm., and at a contact time of about 0.01 seconds to about 5 minutes, preferably about 0.1 seconds to about 10 seconds.

If desired, the photocatalytic stage can be performed using a mixture of one of the catalysts of the present invention and one of the photocatalysts of the present invention. The contaminated gas stream is then photocatalytically treated while placed in contact with the bed containing the catalyst-photocatalyst mixture. Any phosgene in the contaminated gas stream is thus reduced. By performing the photocatalytic treatment in this manner, the post photocatalytic stage catalyst treatment can be omitted.

EXAMPLE 1

An impregnated catalyst was prepared by forming a solution of 1.12 g silicomolybdic acid hydrate, 15.2 g copper(II) nitrate hemipentahydrate, 6.1 ml. hydrochloric acid, and 38.0 ml water. The solution was added to 90 g of a pelleted titania photocatalyst. The impregnated catalyst was dried and calcined at a 375° C. terminal temperature. The catalyst contained 4.5% wt. copper and 1.0 wt % molybdenum.

A second comparison catalyst was obtained by selecting a separate portion of the pelleted titania photocatalyst which had not been impregnated.

Each catalyst was placed individually in a tubular glass reactor having an outer diameter of 28.4 mm and a thickness of 3 mm. A blacklight ultraviolet lamp having a power rating of 16 watts and an arc length of about 273 mm had been positioned in the centerline of each reactor, and sealed using polypropylene bushings at each end. The reaction zone, i.e., the annular space between the ultraviolet lamp and the inner wall of the glass reactor, had a thickness of 5 mm and provided a maximum charge of 80 $cm^3$ of photocatalyst between the bulb and the reactor wall. Each glass reactor had an arrangement for the introduction of the air stream containing organic contaminant and the removal of the purified air stream.

Air was supplied to the two reactors, operated in parallel, by an air compressor. All or a portion of the air could be diverted through a saturator to add TCE to the stream to obtain the desired reactor inlet concentration. The temperature of this jacketed saturator was controlled by circulation through the jacket of a glycol stream from a temperature controlled Lauda Refrigerating Circulator Bath. By control of the saturator air flow rate and the saturator temperature, any desired concentration of contaminant can be achieved in the main air flow stream to the photocatalytic reactor. The total air flow to the reactor was maintained by a flow controller.

An air stream at about 25° C. containing about 200 ppm of TCE at about 30% relative humidity was introduced into each glass reactor at about 1 atm. pressure and passed through the reaction zone which was irradiated by the ultraviolet lamp. In one reactor, approximately 70 $cm^3$ of 8 to 12 mesh photocatalyst consisting of the above copper, molybdenum, titania catalyst was inserted in the reaction zone of the glass reactor. In the second reactor, approximately 70 $cm^3$ of 8 to 12 mesh photocatalyst consisting of the comparison titania catalyst was inserted into the reaction zone of the glass reactor. At steady state, the reactor outlet was analyzed for the concentration of unreacted TCE and phosgene.

The flow rate of entering contaminated air to each of the two reactors was adjusted to provide a similar overall TCE destruction, for comparison of the byproducts produced at

TABLE I

PHOSGENE BYPRODUCT CONTROL IN TCE PHOTOCATALYTIC OXIDATION
USING PHOTOCATALYST OF THE PRESENT INVENTION

| CATALYST TYPE | INLET TCE CONCENTRATION (ppm) | OVERALL TCE CONVERSION (% of Inlet) | EFFLUENT PHOSGENE CONCENTRATION (ppm) |
|---|---|---|---|
| Present Inv. | 203 | 90.7 | <0.25 |
| Comparison Titania | 213 | 91.7 | 3.5 |

The comparison titania photocatalyst produced substantial phosgene. This is not desirable. Surprisingly, the addition of the claimed catalytic metals to the same titania support results in a photocatalyst which produces less than the limit of detectability of phosgene, or less than 0.25 ppm. This is a surprisingly high photocatalyst selectivity. Heretofore, there has been no available method to control phosgene production from a titania photocatalyst.

EXAMPLE 2

A phosgene destruction catalyst was made by a similar impregnation method as used in Example 1, except the support was activated carbon instead of titania. The analysis of the catalyst showed that it contained 4.2% wt copper and 0.93% wt molybdenum on the activated carbon. This catalyst was used to remove phosgene from a contaminated air stream.

The contaminated gas stream was produced as follows. Air was supplied to the reactor system by an air compressor. All or a portion of the air can be diverted through a saturator to add TCE to the stream to obtain the desired reactor inlet concentration. The temperature of this jacketed saturator was controlled by circulation through the jacket of a glycol stream from a temperature controlled Lauda Refrigerating Circulator Bath. By control of the saturator air flow rate and the saturator temperature, any desired concentration of contaminant can be achieved in the main air flow stream to the photocatalytic reactor. The total air flow to the reactor was maintained by a flow controller.

This air contaminated with TCE was passed through three reactors in series. The first reactor was a photolytic reactor, which destroyed TCE but produced a phosgene byproduct. The second reactor was a photocatalytic reactor containing a silica-titania-zirconia photocatalyst, which also destroyed TCE. The third reactor contained the phosgene destruction catalyst described above of the present invention which destroyed the phosgene in the presence of the products of reaction of the prior two reactors which included HCL, $Cl_2$, CO, $CO_2$, and $H_2O$.

The third reactor containing the claimed phosgene destruction catalyst was one inch in diameter, containing 20 cc. of said catalyst placed over 20 cc of glass beads. It was fed by 1.3 L/min. of the contaminated air stream leaving the photocatalytic bed, with the following performance results.

TABLE II

LONG TERM PERFORMANCE OF CU—MO PHOSGENE DESTRUCTION CATALYST OF THE PRESENT INVENTION

| Run Conditions | Catalyst Performance | Catalyst Performance | Catalyst Performance |
|---|---|---|---|
| Time on Stream, hrs | 528 | 643 | 1,197 |
| Catalyst T, ° F. | 126 | 193 | 128 |
| Inlet Hcl Conc, ppm | 100 | 150 | 100 |
| Inlet $Cl_2$ Conc, ppm | 125 | 100 | 130 |
| Inlet CO Conc, ppm | 170 | 150 | 170 |
| Inlet $H_2O$ Conc, ppm | 5.4 | 13 | 5.4 |
| Inlet Phosgene, ppm | 3 | 5 | 3 |
| Outlet Phosgene, ppm | 0 | 0 | 0 |

Unlike an adsorption system, the catalysts of the present invention can be operated for extended time periods without loss of performance as shown in Table II. By contrast, an adsorption system exposed to the feed gas of Table II experiments would be saturated and exhausted in a manner of hours. As shown in Table II, the claimed catalysts continue to be highly effective in destruction of phosgene even after 1200 hours of continuous operation, and there is no evidence at that time of any loss of performance. Further, Sauer et al. teach that activated carbon will produce phosgene from CO and $Cl_2$ at the conditions of Table II. Surprisingly, the catalyst of Table II which contains activated carbon not only does not produce phosgene, it efficiently destroys it. The catalyst is surprisingly effective and long lived.

EXAMPLE 3

Two additional phosgene destruction catalysts were made by a similar impregnation method as used in Example I, except the support was activated carbon instead of titania. One of the catalysts contained 4.2 wt % copper on the activated carbon and no other active metals. The second catalyst contained 1.0 wt % molybdenum on the activated carbon, and no other active metals. These catalysts were used to remove phosgene from the phosgene-contaminated air stream generated from the equipment of Example 2, with 20 cc of each catalyst charged to its own individual reactor. The inlet composition of the gas entering the phosgene destruction reactor was similar to that of Table II, except the moisture content was 10 mg/L. The flow rate to the phosgene destruction reactor was 4 L/min., and the reactor temperature was about 130° F. The following results were obtained.

TABLE III

PERFORMANCE OF PHOSGENE DESTRUCTION CATALYSTS
OF THE PRESENT INVENTION

| CATALYST TYPE | 4.2% Copper | 1.0% Molybdenum |
|---|---|---|
| Time on Stream, hrs. | 430 | 430 |
| Inlet Phosgene, ppm | 3 | 3 |
| Outlet Phosgene, ppm | <0.25 | <0.25 |

Both catalysts destroy phosgene beyond the limit of analytical detectability for this system, or less than 0.25 ppm phosgene. Further, the catalysts continue to destroy phosgene for long periods of time, and no evidence of loss of performance is evident even at that time. For the reasons describe above, these catalysts are surprisingly effective for phosgene destruction.

Comparison Example

The phosgene containing off-gas generated from the system of Example 2 was passed over an activated carbon bed, for comparison of prior art catalysts, at a flow rate of 4 L/min. In accordance with the teachings of U.S. Pat. No. 4,301,126, 20 cc of activated carbon were charged to the third reactor in the sequence of Example 2. The phosgene-contaminated gas passed over this prior art catalyst at a temperature of about 22° C.

In a separate test, the phosgene-containing off-gas generated from the system of Example 2 was passed over an activated carbon bed containing liquid water, in accordance with the teachings of German Patent No. 961,681. The flow rate of gas was 4 L/min. A total of 20 cc. of activated carbon was charged to the third reactor in the sequence of Example 2. To provide the liquid water disclosed by the '681 patent, 80 cc. of distilled water was used to wash the carbon, and the excess water was drained from the reactor. This washing and draining procedure was repeated three times, in sequence, and each sequence was performed twice each day. The phosgene-containing gas passed over the prior art catalyst at a temperature of about 22° C.

When the test was performed, these two activated carbon systems of the prior art adsorbed some phosgene for the first few hours. Then, as the entering phosgene saturated the carbon, the phosgene content of the effluent gas rapidly increased. Results obtained after an operating period of 19 hours and after an operating period of 44 hours are shown in Table IV.

It is clear that the performance of the prior art catalysts of Table IV are inferior to those of the present invention. After only 19 hours on stream, the prior art catalysts remove little or no phosgene at these same test conditions as used for the catalysts of the present invention. By contrast, results shown in the prior examples show that the catalysts of the present invention provide excellent performance for hundreds of hours of operation, and even then, there is no evidence of performance loss.

TABLE IV

PERFORMANCE OF PRIOR ART
PHOSGENE DESTRUCTION CATALYSTS

| CATALYST TYPE | ACTIVATED CARBON IN HUMID AIR | ACTIVATED CARBON WITH LIQUID WATER |
|---|---|---|
| Time on Stream (hrs) | 19 | 19 |
| Inlet Phosgene Conc. (ppm) | 3 | 3 |
| Outlet Phosgene Conc. (ppm) | 1 | 3 |
| ******** | ******** | |
| Time on Stream (hrs) | 44 | 44 |
| Inlet Phosgene Conc. (ppm) | 8 | 8 |
| Outlet Phosgene Conc. (ppm) | 3 | 5 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for treating a contaminated gas stream so as to reduce any phosgene content in said gas stream comprising the steps of:
   (a) providing a catalyst comprising at least one metal selected from the group consisting of copper, zinc, iron, tungsten, molybdenum, chromium, and mixtures thereof distributed over a catalyst support comprising a material containing at least one of silicon, titanium, zirconium, magnesium, aluminum, and activated carbon;
   (b) operating said catalyst at a temperature from about 0° C. to about 250° C. at a pressure from about 0.1 atm. to about 10 atm., and at a contact time of about 0.01 seconds to about 5 minutes; and
   (c) reducing said phosgene content in said gas stream by reacting said phosgene in said gas stream by placing said gas stream in contact with said catalyst.

2. A process according to claim 1, wherein said temperature is in a range of from about 25° C. to about 100° C.

3. A process according to claim 1, wherein said pressure is in a range from about 0.8 atm. to about 2.0 atm.

4. A process according to claim 1, wherein said contact time is from about 0.1 seconds to about 10 seconds.

5. A process according to claim 1, wherein said step of providing a catalyst comprises providing a photocatalyst comprising said at least one metal selected from the group consisting of copper, zinc, iron, tungsten, molybdenum, chromium, and mixtures thereof distributed over said catalyst support comprising said material containing said at least one of silicon, titanium, zirconium, magnesium, aluminum, and activated carbon and wherein said reducing step comprises placing said gas stream in contact with said photocatalyst so as to reduce said phosgene contact, prevent the formation of any phosgene, and remove any CVOCs from said gas stream.

6. A process according to claim 5, wherein said photocatalyst providing step comprises providing a photocatalyst having said at least one metal present in an amount from 0.001 wt % to about 15 wt %.

7. A process according to claim 5, wherein said photocatalyst providing step comprises distributing at least two of said metals over said catalyst support with the total of said metals not exceeding 20 wt %.

8. A process according to claim 5, wherein said photocatalyst providing step comprises providing a photocatalyst having tungsten or molybdenum in an amount from 0.015 wt % to about 5.0 wt % distributed over said catalyst support.

9. A process according to claim 5, wherein said photocatalyst providing step comprises providing a photocatalyst having a photocatalytically active support comprised primarily of silica, titanium in an amount up to about 5.0 wt %, zirconium in an amount up to 5.0 wt %, and oxygen in an amount consistent with the chemical composition of the oxides of silicon, titanium, and zirconium.

10. A process according to claim 5, wherein said photocatalyst providing step comprises providing a photocatalyst having a photocatalytically active support comprised of silicon in an amount from about 0.1 wt % to about 70 wt %, titanium dioxide in an amount from about 30 wt % to about 90 wt %, tungsten in an amount from about 0.1 wt % to about 50 wt % and at least one of platinum and palladium in an amount from about 0.01 wt % to about 10 wt %.

11. A process according to claim 10, wherein said tungsten is present in an amount from about 1.0 wt % to about 30 wt %.

12. A process according to claim 10, wherein said at least one of platinum and palladium is present in an amount from about 0.1 wt % to 5.0 wt %.

13. A process according to claim 5, wherein said photocatalyst providing step comprises providing a photocatalyst having a photocatalytically active support comprised principally of titania and containing up to 5.0 wt % of at least one of platinum and palladium.

14. A process according to claim 5, wherein said photocatalyst providing step comprises providing a photocatalyst having a photocatalytically active support comprised principally of silica and containing up to 5.0 wt % of at least one of platinum and palladium.

15. A process according to claim 5, wherein said catalyst providing step comprises providing a catalyst having copper and molybdenum distributed over a catalyst support formed from titania.

16. A process according to claim 5, wherein said catalyst providing step comprises providing a catalyst having a support formed from a titanium containing material and further having a material which forms a silicon-tungsten bond deposited on said support.

17. A process according to claim 16, wherein said material forming said silicon-tungsten bond comprises a compound containing silicon and tungsten.

18. A process according to claim 1, further comprising:
providing a photocatalytic stage;
passing said contaminated gas stream through said photocatalytic stage while operating said photocatalytic stage at a temperature from about 0° C. to about 250° C. at a pressure from about 0.1 atm. to about 10 atm., and at a contact time of about 0.01 seconds to about 5 minutes to produce a gas stream having a reduced CVOC content; and
reducing any phosgene co-product found in the effluent of the photocatalytic stage by passing said effluent over said catalyst.

19. A process according to claim 18, wherein said temperature of said photocatalytic stage is in a range of from about 25° C. to about 100° C. and said operational temperature of said catalyst is in a range of from about 25° C. to about 100° C.

20. A process according to claim 18, wherein said pressure in said photocatalytic stage is in a range from about 0.8 atm. to about 2.0 atm. and said catalyst operational pressure is in a range of from about 0.8 atm. to about 2.0 atm.

21. A process according to claim 18, wherein said contact time is from about 0.1 seconds to about 10 seconds.

22. A process according to claim 18, wherein said photocatalytic stage has a photocatalyst bed containing a photocatalyst and a source of UV radiation and said passing step comprises passing said contaminated gas stream over said photocatalyst bed while said photocatalyst is illuminated by said source of UV radiation.

23. A process according to claim 22, wherein said UV radiation has a wavelength of about 100 to 400 nanometers.

24. A process according to claim 22, wherein said UV radiation has a wavelength of about 185 to 375 nanometers.

25. A process according to claim 22, wherein said photocatalyst in said photocatalyst bed used in said photocatalytic stage is comprised of silicon, titanium in an amount from about 0.015 wt % to about 5.0 wt %, zirconium in an amount from about 0.015 wt % to about 5.0 wt %, oxygen in an amount consistent with the chemical composition of the oxides of silicon, titanium, and zirconium, and the balance primarily silica.

26. A process according to claim 22, wherein said photocatalyst in said photocatalyst bed comprises silicon in an amount from about 0.1 wt % to about 70 wt %, titanium oxide in an amount from 30 wt % to about 90 wt %, tungsten in an amount from about 0.1 wt % to about 50 wt % and at least one of platinum and palladium in an amount from about 0.01 wt % to about 10 wt %.

27. A process according to claim 26, wherein said tungsten is present in an amount from about 1.0 wt % to about 30 wt %.

28. A process according to claim 26, wherein said at least one of platinum and palladium is present in an amount from about 0.1 wt % to about 5.0 wt %.

29. A process according to claim 22, wherein said photocatalyst in said photocatalyst bed comprises primarily at least one of silica and titania and at least one of platinum and palladium in an amount from about 0.01 wt % to about 5.0 wt %.

30. A process according to claim 22, wherein said photocatalyst used in said photocatalytic bed is formed primarily from silica.

31. A process according to claim 22, wherein said photocatalyst used in said photocatalytic bed is formed primarily from titania.

32. A process according to claim 18, further comprising providing a photolytic stage prior to said photocatalytic stage and passing said contaminated gas stream through said photolytic stage prior to passing said contaminated gas stream through said photocatalytic stage.

33. A process according to claim 1, further comprising:
providing a photolytic stage;
passing said contaminated gas stream through said photolytic stage; and
said reducing step comprising reducing any phosgene co-product found in the effluent of said photolytic stage by passing said effluent over said catalyst.

34. A process according to claim 1, wherein said catalyst providing step comprises providing a catalyst having copper and molybdenum distributed over a catalyst support formed from titania.

35. A process according to claim 1, wherein said catalyst providing step comprises providing a catalyst having a support formed from a titanium containing material and further having a material which forms a silicon-tungsten bond deposited on said support.

36. A process according to claim 35, wherein said material forming said silicon-tungsten bond comprises a compound containing silicon and tungsten.

37. A process according to claim 1, further comprising:
mixing said catalyst with a photocatalyst; and
said reducing step comprising photocatalytically treating said contaminated gas stream while placing said contaminated gas stream in contact with a bed containing said catalyst-photocatalyst mixture.

* * * * *